(12) United States Patent
Grennan et al.

(10) Patent No.: US 7,788,253 B2
(45) Date of Patent: Aug. 31, 2010

(54) GLOBAL ANCHOR TEXT PROCESSING

(75) Inventors: Frederick Stephen Grennan, San Jose, CA (US); Ronny Lempel, Haifa (IL); Andreas Neumann, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/617,401

(22) Filed: Dec. 28, 2006

(65) Prior Publication Data

US 2008/0162425 A1 Jul. 3, 2008

(51) Int. Cl.
*G06F 7/00* (2006.01)
*G06F 17/30* (2006.01)
(52) U.S. Cl. ...................... 707/709; 707/711
(58) Field of Classification Search .............. 707/709, 707/711
See application file for complete search history.

(56) References Cited

U.S. PATENT DOCUMENTS

| | | | | |
|---|---|---|---|---|
| 5,920,859 | A | * | 7/1999 | Li .............................. 707/5 |
| 7,308,643 | B1 | * | 12/2007 | Zhu et al. .................... 715/206 |
| 2003/0135495 | A1 | * | 7/2003 | Vagnozzi ..................... 707/3 |
| 2005/0240580 | A1 | | 10/2005 | Zamir et al. |
| 2006/0143254 | A1 | | 6/2006 | Chen et al. |

FOREIGN PATENT DOCUMENTS

EP 1643383 5/2006

OTHER PUBLICATIONS

Gyongyl, Z. and H. Garcia-Molina, "Web Spam Taxonomy", Technical Report, Stanford University, Mar. 14, 2004, pp. 1-11.
Chinese Office Action, Jul. 17, 2009, CN Application No. 2007-101927560, 8 pp.
Translation of Chinese Office Action, Jul. 17, 2009, CN Application No. 2007-101927560, 7 pp.
CN1755678, published Apr. 5, 2006, pp. 20.
English Abstract for CN1755678, published Apr. 5, 2006, p. 1.

* cited by examiner

*Primary Examiner*—John R Cottingham
*Assistant Examiner*—Mariela D Reyes
(74) *Attorney, Agent, or Firm*—Janaki K. Davda; Konrad Raynes & Victor LLP (57) ABSTRACT

Provided are techniques for building a search index. While building the search index and using the search index to respond to one or more search requests, an anchor information store is maintained, wherein each entry of the anchor information store identifies a referring document, a target document, and anchor text associated with a link from the referring document to the target document; a document is received for processing; one or more entries in the anchor information store for which the document to be processed is identified as the target document are located; anchor text is retrieved from each of the identified entries; and the retrieved anchor text is stored in an entry of the search index for the document.

24 Claims, 7 Drawing Sheets

GLOBAL ANCHOR TEXT PROCESSING

BACKGROUND

1. Field

Embodiments of the invention relate to global anchor text processing.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page. When the link is selected in the first Web page, the second Web page is typically displayed.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

An anchor may be described as a link or path to a document (e.g., a URL). Anchor text may be described as text associated with a path or link (e.g., a URL) that points to a document. For example, anchor text may be text that labels or encloses hypertext text links in Web documents. Anchor text is collected by Web search engines and is associated with target documents. Also, the anchor text and target documents are indexed together.

Anchor text may also be described as content found in one HyperText Markup Language (HTML) document (the "referring" document) that annotates a link to another document (the "target" document). Anchor text is contained lexically inside an anchor tag (<A> ... </A>). Anchor text can improve search quality because it encodes a human editor's judgment about the area of relevance of the target document. To make anchor text searchable, though, the anchor text has to be indexed as if the anchor text were part of the target document's content, even though the anchor text actually enters the search system as part of other, referring documents.

When Web search engines process documents in a corpus (e.g., retrieve and index documents), it is not possible to keep all the documents in memory until all cross links are known. Thus, the traditional solution is to catalog document content and anchor text separately, and then run an offline global-integration process to combine anchor text and document content for indexing.

If integration is postponed until all of the corpus's content has been crawled (i.e., retrieved), then all the anchor text is available, and the combined index only needs to be constructed once. But if this is done, the content-only index can not be created until the whole corpus has been crawled. Alternatively, the content-only index can be written and be made available, but no anchor-text searching will be possible until after the integration phase, which requires updating the index.

Thus, there is a need in the art for improved global anchor text processing.

SUMMARY OF EMBODIMENTS OF THE INVENTION

Provided are a method, computer program product, and system for building a search index. While building the search index and using the search index to respond to one or more search requests, an anchor information store is maintained, wherein each entry of the anchor information store identifies a referring document, a target document, and anchor text associated with a link from the referring document to the target document; a document is received for processing; one or more entries in the anchor information store for which the document to be processed is identified as the target document are located; and anchor text is retrieved from each of the identified entries. The retrieved anchor text is stored in an entry of the search index for the document.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
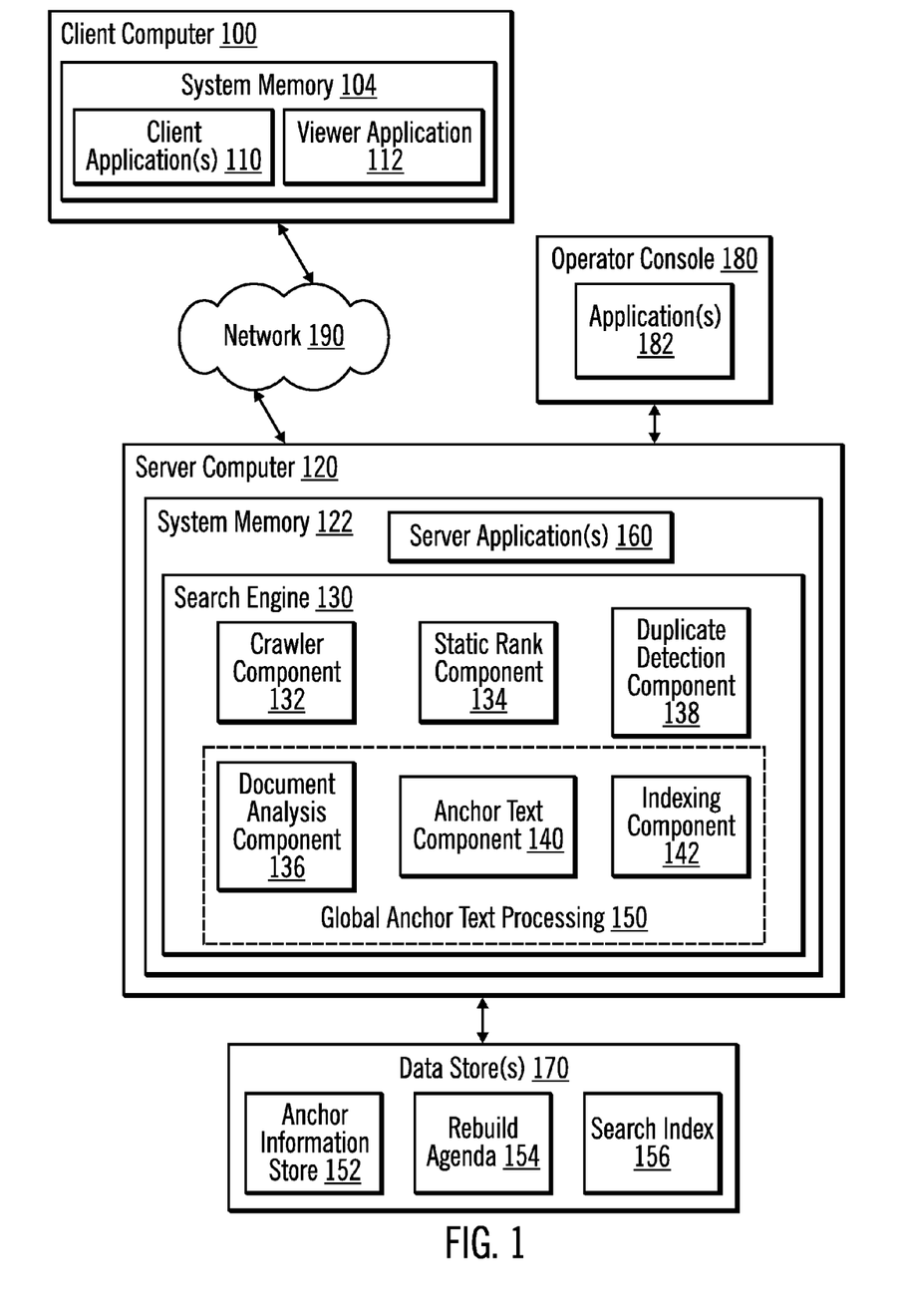
FIG. 1 illustrates, in a block diagram, a computing environment in accordance with certain embodiments of the invention.

FIG. 1 illustrates, in a block diagram, a computing environment in accordance with certain embodiments of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Local Area Network (LAN), Wide Area Network (WAN), the Internet, an Intranet, etc. The client computer 100 includes system memory 104, which may be implemented in volatile and/or non-volatile devices. One or more client applications 110 and a viewer application 112 may execute in the system memory 104. The viewer application 112 provides an interface that enables searching of a set of documents. In certain embodiments, the viewer application 112 is a Web browser, the data store 170 stores tokens (rather than crawled, original documents), and the viewer application 112 displays a summary (constructed from the tokens) and a URL pointing to an original document in an original location. A token may be described as a term (e.g., word, number, sequence of logograms, or other contiguous string of symbols) appearing in a document.

The server computer 120 includes system memory 122, which may be implemented in volatile and/or non-volatile devices. A search engine 130 executes in the system memory 122. In certain embodiments, the search engine includes a crawler component 132, a static rank component 134, a document analysis component 136, a duplicate detection component 138, an anchor text component 140, and an indexing component 142. Although components 132, 134, 136, 138, 140, and 142 are illustrated as separate components, the functionality of components 132, 134, 136, 138, 140, and 142 may be implemented in fewer or more or different components than illustrated. Additionally, the functionality of the components 132, 134, 136, 138, 140, and 142 may be implemented at a Web application server computer or other server computer that is connected to the server computer 120. Additionally, one or more server applications 160 execute in system memory 122.

In certain embodiments, global anchor text processing 150 is implemented using the document analysis component 136, the anchor text component 140, and an indexing component 142.

The server computer 120 provides the client computer 100 with access to data in at least one data store 170 (e.g., a database). Although a single data store 170 is illustrated, for ease of understanding, data in data store 170 may be stored in data stores at other computers connected to server computer 120. The one or more data stores include an anchor information store 152, a rebuild agenda 154, and a search index 156.

In certain embodiments, each entry in the anchor information store 152 includes at least a set of triples: (D, Ti, anchor text) where D is a referring document, Ti is a target document, and anchor text is the text contained in a link tag for the link from the referring document to the target document. Each entry in the anchor information store 152 may contain additional information, such as a static score, a language of the referring document, or a fingerprint/checksum of the referring document, which would help avoid using links from identical duplicates of the same referring document.

In certain embodiments, each entry of the rebuild agenda 154 contains an identifier of a document (e.g., a URL of that document) whose anchor text is to be updated in the search index 156 with asynchronous processing. For each identified document, there is at least one new or updated link pointing to that document.

In certain embodiments, the search index 156 contains both document content and anchor text associated with links pointing to the document. In such embodiments, the document content and anchor text may be updated independently. In certain embodiments, anchor text is not updated independently (e.g., systems in which anchor text update requires re-indexing of an entire document). In certain embodiments, the search index 156 is available for searching at all times, but newly indexed documents may appear in search results after a slight delay because writes to disk are buffered for better performance.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain embodiments of the invention.

Figure 2:
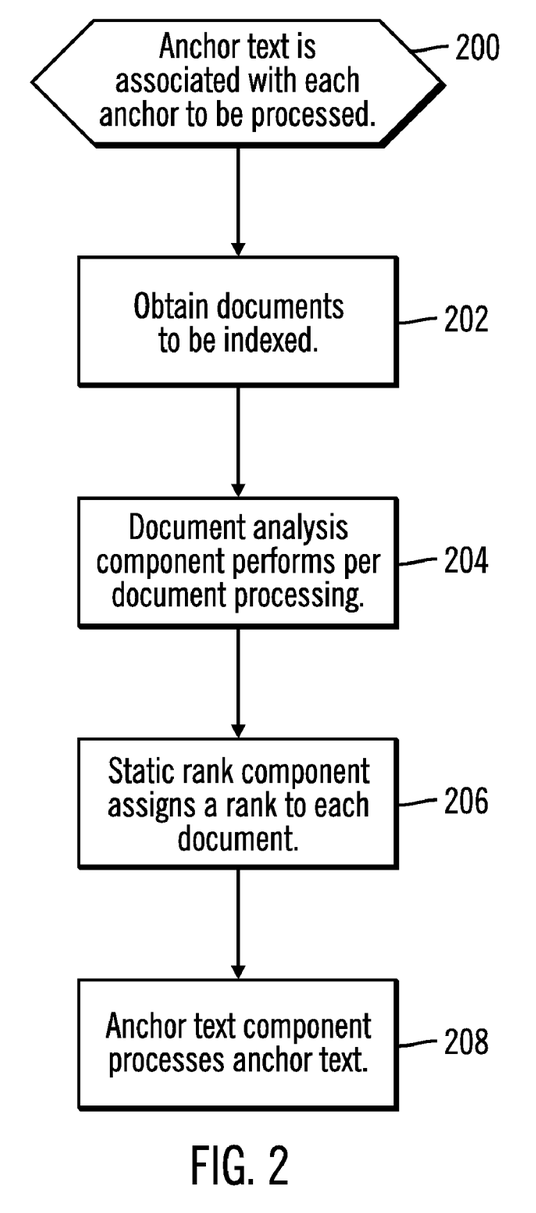
FIG. 2 illustrates logic implemented to prepare anchors for processing in accordance with certain embodiments of the invention

FIG. 2 illustrates logic implemented to prepare anchors for processing in accordance with certain embodiments of the invention. Control begins at block 200 with anchor text being associated with each anchor. This may be done, for example, by each user who creates an anchor. An anchor may be described as a path or link (e.g., a URL) from a source (or "referring") document to a target document.

In block 202, documents that are to be indexed by the search engine 130 are obtained. In certain embodiments, the documents are published or pushed (e.g., as may be the case with newspaper articles) to the indexing component 142. In certain embodiments, the crawler component 132 discovers, fetches, and stores the documents. In certain embodiments, the crawler component 132 may discover documents based on, for example, certain criteria (e.g., documents were accessed within the last month). Additionally, the crawler component 132 may discover documents in one or more data stores connected directly (e.g., data store 170) or indirectly (e.g., connected to server computer 120 via another computing device (not shown)). In certain embodiments, the crawler component 132 discovers, fetches, and stores tokens and URLs in data store 170. The crawled documents may be referred to as a "collection of documents".

In block 204, the document analysis component 136 performs per document analysis. In particular, the document analysis component 136 parses and tokenizes the documents, and determines, for each document, the language in which each document was written, extracts anchor text, and performs other tasks such as, categorization and classification of the documents. The language information is stored for later use. For example, the document analysis component 136 determines whether the primary language used in the document is English, Japanese, German, etc. As part of extracting the anchor text, the document analysis component 136 also associates a proximity class with each anchor. A proximity class may be described as specifying how close a source document is to a target document (e.g., whether they are on the same server, and if so, whether they are in the same directory). Also, the extracted anchor text is ready to be processed by the anchor text component 140.

In block 206, the static rank component 134 reviews the stored documents and assigns a rank to the documents. The rank may be described as the importance of the source document relative to other documents that have been stored by the crawler component 132. Any type of ranking technique may be used. For example, documents that are accessed more frequently may receive a higher rank. In block 208, the anchor text component 140 processes anchor text.

With certain embodiments, the search index 156 is updated incrementally and continuously. Anchor-text processing occurs in two contexts: synchronous and asynchronous.

In certain embodiments that include duplicate detection, whenever a new anchor from a referring document ("R") to a target document ("T") (R->T) is added, the anchor text component 140 recomputes anchor text for the target document T, as well as for any duplicates. In certain embodiments, when computing the target anchor text for target document T, links pointing to duplicates of T may be included too.

In certain embodiments that include static ranking, static ranking information may be used to prioritize anchor text if a page has a large number of links pointing to it, so that, rather than incorporating all of the anchor text from the links into the target anchor text, anchor text from a configurable number of the most meaningful referring documents is incorporated into the target anchor text.

In certain embodiments that include language identification, the language identification for referring documents may help decide the language for the target document. That is, if a target document has mainly links from documents in one language, the target document is most likely in the same language.

Figure 3:
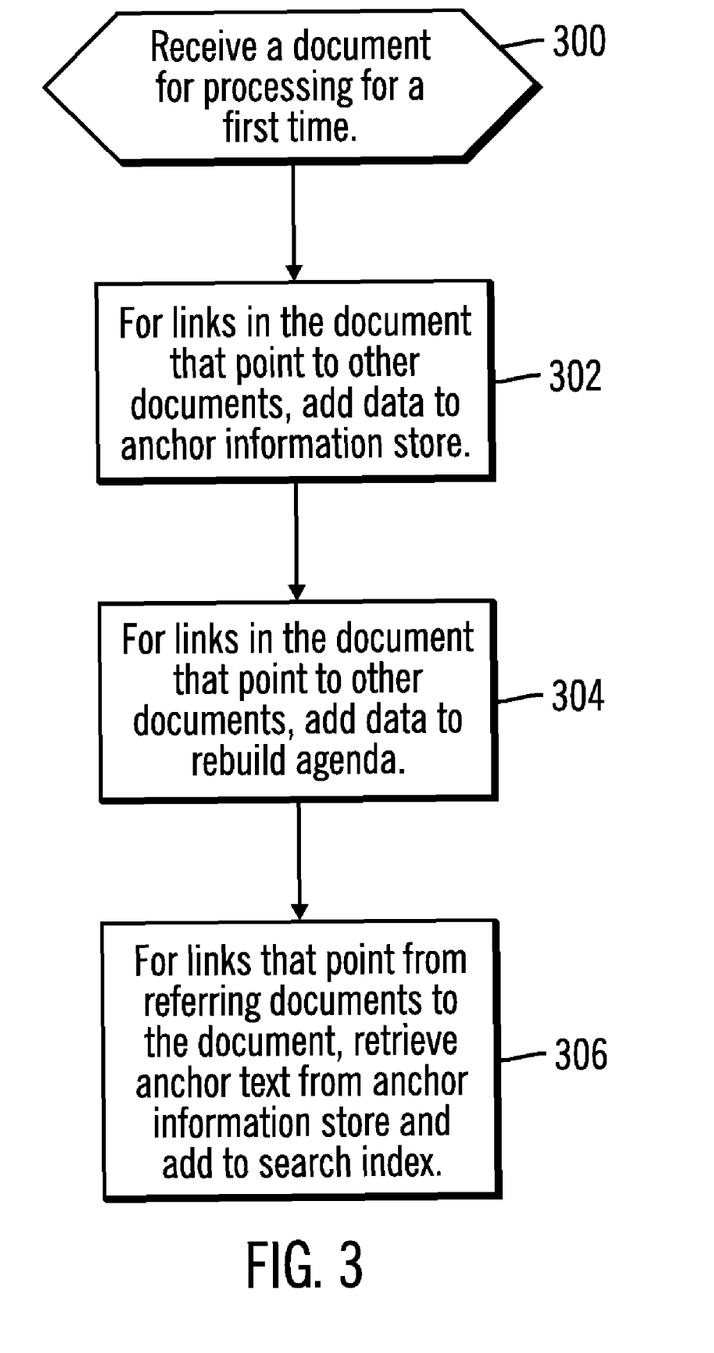
FIG. 3 illustrates logic performed in a synchronous context in accordance with certain embodiments.

FIG. 3 illustrates logic performed in a synchronous context in accordance with certain embodiments. The logic of FIG. 3 is performed while building the search index 156 and using the search index 156 to respond to one or more search requests. Control begins at block 300 with the document analysis component 136 receiving a document for processing for a first time. In block 302, for links in the document that point to other documents ("outgoing" links), data is added to an anchor information store 152. In particular, as the document analysis component 136 is parsing the document, when the document analysis component 136 finds an outgoing link, the document analysis component 136 adds data to the anchor information store. For example, when a document D (e.g., an HTML document) is indexed, any anchor text that document D contains, pointing to other documents, is recorded as a set of triples: (D, Ti, text) in the anchor information store 152.

In block 304, for links in the document that point to other documents, data is added to a rebuild agenda 154. For example, if the document includes three outgoing links, each pointing to a target document, the rebuild agenda 154 is updated with the URLs of these three target documents.

In block 306, for links that point from referring documents to the document being processed in the anchor information store 152, anchor text is retrieved from the anchor information store 152 and added to the search index 156. In particular, the document analysis component 136 locates entries in the anchor information store 152 for which the document being processed is listed as the target document, retrieves anchor text from those entries from the anchor information store 152, and forwards the anchor text to the indexing component 142 to add to the search index 156.

For a document D, unless that document is a "seed" URL, document D is being crawled because document D was referred to by a link in a document processed earlier. A "seed" URL may be described as one that is entered manually by an administrator, rather than being discovered by the crawler component 132 as a link in another document. At the beginning of a crawl, the crawler component 132 has no links and has to be "seeded" with some URLs with which to start crawling. When these documents are first crawled, no other documents refer to them, but as the crawl progresses, the crawler component 132 is likely to find other documents that do point at the seed URLs. Thus, there may be anchor text from several such documents referring to document D by the time document D is processed. So, before indexing document D for the first time, the anchor-text anchor information store 152 is consulted, and any already known anchor text for document D is included when document D is first indexed in the search index 156.

Figure 4:
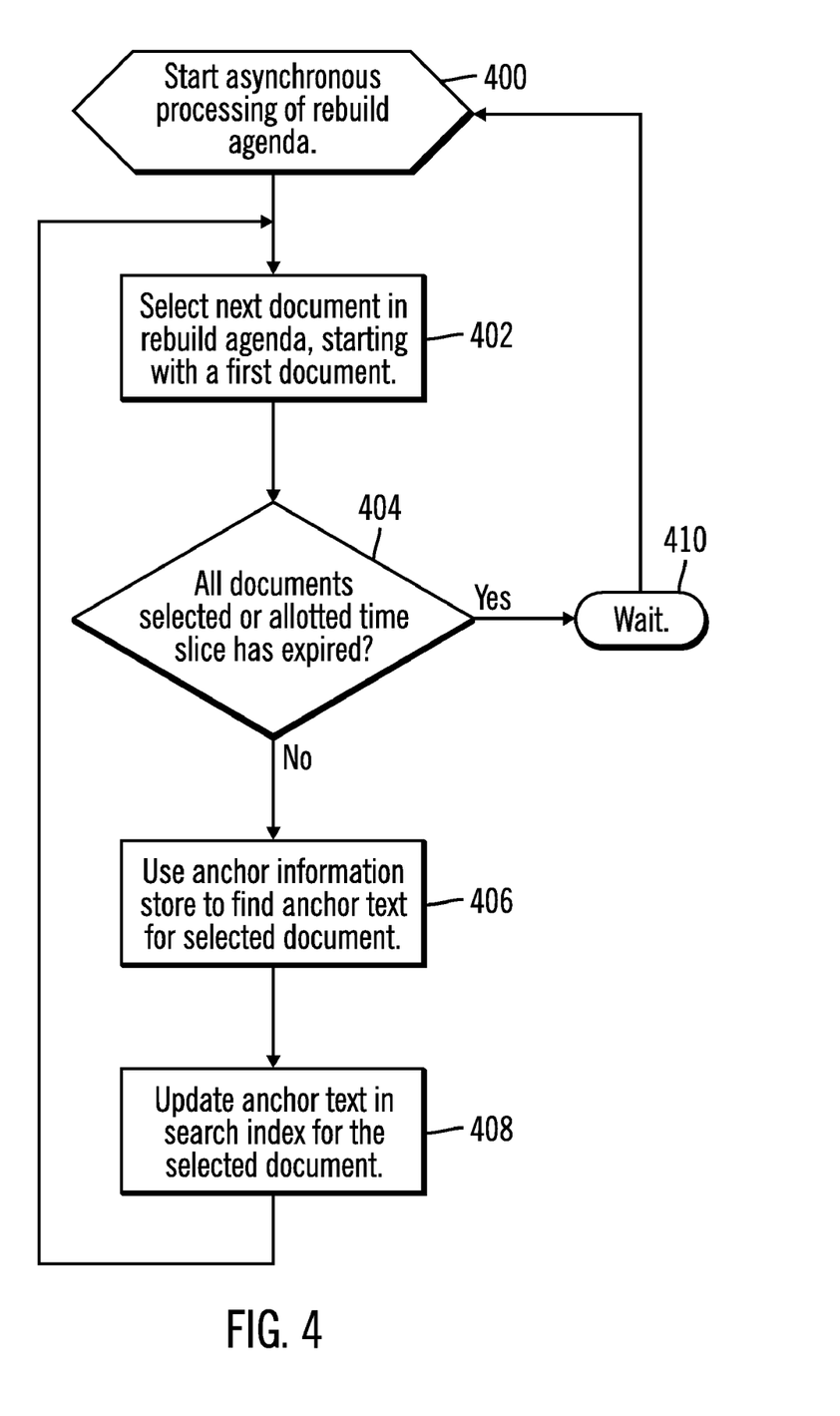
FIG. 4 illustrates logic performed in an asynchronous context in accordance with certain embodiments.

FIG. 4 illustrates logic performed in an asynchronous context in accordance with certain embodiments. Control begins at block 400 with the search engine 130 starting asynchronous processing of the rebuild agenda 154. In certain embodiments, when the load (i.e., documents waiting to be indexed) is low enough (e.g., nearly zero), the asynchronous anchor text rebuilding cycle is given a fixed time slice. In certain alternative embodiments, the rebuilding may occur periodically (e.g., every 4 hours) or based on some event happening (e.g., 100 new documents being processed). Embodiments build the anchor text in an incremental way, without the need for a batch rebuild of all anchor text at the same time. Thus, at any given time, there may be one or more target documents for which new links have been discovered since anchor text for that target document was last computed. In certain embodiments, rather than running the asynchronous anchor text rebuilding cycle continuously (which may create a too high load on the system), the logic of FIG. 4 computes the anchor text for some number of targets at a time. In alternative embodiments, the asynchronous anchor text rebuilding cycle may be run continuously. Thus, embodiments build anchor text for a target document incrementally, reflecting change as new links and associated anchor text is discovered, rather than globally, where all anchor text is recomputed periodically, regardless of whether links have changed.

In block 402, the anchor text component 140 selects the next document in the rebuild agenda 154 (i.e., by selecting the URL representing that document), starting with a first document. In block 404, the anchor text component 140 determines whether all documents in the rebuild agenda 154 have been selected or if the allotted time slice has expired. If so, processing continues to block 410, otherwise, processing continues to block 406. Thus, the asynchronous anchor text rebuilding cycle stops if there are no more targets needing rebuilding or if the time slice allotted by the search engine 130 has expired (even if there are more URLs in the rebuild agenda 154).

If all documents have been selected, in block 410, the search engine 130 waits until it has determined that the system load permits spending some time to rebuild some anchor-text, at which time processing continues to block 400.

In block 406, the anchor text component 140 uses the anchor information store 152 to find anchor text for the selected document. In particular, the anchor text component 140 identifies entries in the anchor information store 152 in which the selected document is a target and retrieves the anchor text in these entries. In block 408, the anchor text component 140 updates anchor text in the search index 156 for the selected document. In certain embodiments, the anchor text is updated independently of document content in the search index 156. In certain embodiments, anchor text is not updated independently (e.g., systems in which anchor text update requires re-indexing of an entire document). From block 406, processing continues to block 402.

Thus, in the asynchronous context, when a document D (e.g., an HTML document) is indexed, document D's outgoing links are added to the anchor information store 152. Each entry added to the anchor information store 152 contains a fragment of anchor text that belongs in the indexed content for some target document T. Each new anchor information store entry, therefore, makes the currently indexed content for document T out-of-date. Thus, embodiments periodically rebuild anchor text for index entries. Also, because the rebuild agenda 154 maintains a list of target documents known to need updating, efficiency is gained by just updating the anchor text for these target documents.

With certain embodiments, in background processing, in parallel with searching, the anchor text component 140 pulls target documents in turn from the rebuild agenda 154, consults the anchor information store 152 to find all anchor text references to each target document, and updates each target document's index entry in the search index 156 to reflect the anchor text. Each time a target document's index entry is updated in the search index 156, search quality for that target document and the indexed terms improves, resulting in a continuous improvement in search quality.

In certain embodiments, the anchor information store 152 is implemented as a relational table with three columns and maps naturally to a relational database. In some cases, this table is searched for all entries belonging to a given referring document, and, in some cases, this table is searched for those entries belonging to a given target document, and so two indices are used.

In certain embodiments, the anchor information store 152 is implemented as an index that may be configured to store an intact copy of data (i.e., the anchor text) that may be used again and not to store a copy of indexed (tokenized) strings whose original form is not needed at retrieval time (i.e., for the referring URLs). Both the relational table and index embodiments perform well in terms of speed.

In certain embodiments, the anchor information store 152 is implemented as one or more flat files. With such embodiments, insertion is very fast as entries may be appended to the end of a flat file. Also, with such embodiments, retrieval may require disk sorting to reduce the data to unique entries, and the order of iteration over the referring and target URLs is dictated by the sort order.

In certain embodiments, an abstract "store" Application Programming Interface (API) hides the index and the relational database embodiments behind a common set of operations required by the higher level anchor text component 140. The store API handles deletions of documents by removing anchor information store entries containing the removed document and flagging the affected target documents for updating.

When a referring document is not deleted, but rather updated with a new version, the old entries containing that document as the referring document in the anchor information store 152 are removed, and the anchors in the new version of the document are added to the anchor information store 152. This is equivalent to delete and insert operations of that referring document's anchor text.

That is, when the document has been updated with new content, existing entries in the anchor information store 152 for which the document is a referring document are compared with a current set of anchors in the document. Each entry that no longer matches the document content (e.g., an entry that includes an anchor that does not exist in the updated document) is deleted from the anchor information store 152. A new entry is added to the anchor information store 152 for each new anchor in the document (i.e., any new entry that stems from the current state of the document content is added to the anchor information store 152). A target document of any entry that was either deleted from or added to the anchor information store 152 is added to the rebuild agenda 154.

In certain embodiments, the rebuild agenda 154 may be described as a list combining First-In First-Out (FIFO) semantics and set semantics (i.e., no duplicates) and is used to keep track of which target documents need updating.

In certain embodiments, during intensive indexing, the anchor text component 140 may need to remember a large number of pending updates for some time, larger and longer than would be desirable with an in-memory solution. Thus, the rebuild agenda 154 may be implemented as an order-preserving hash set backed by a hierarchical disk store scalable to millions of entries. Entries (e.g., URLs) are added to an in-memory table until a configurable limit is reached, at which point the table is flushed to disk. Fetches return from the oldest disk file first, as if from a persistent ring buffer. Duplicates do not occur in the table, or within one saved batch, but two separate batches may contain entries in common. These embodiments accept some duplication in return for memory savings, and performance is good.

Figure 5:
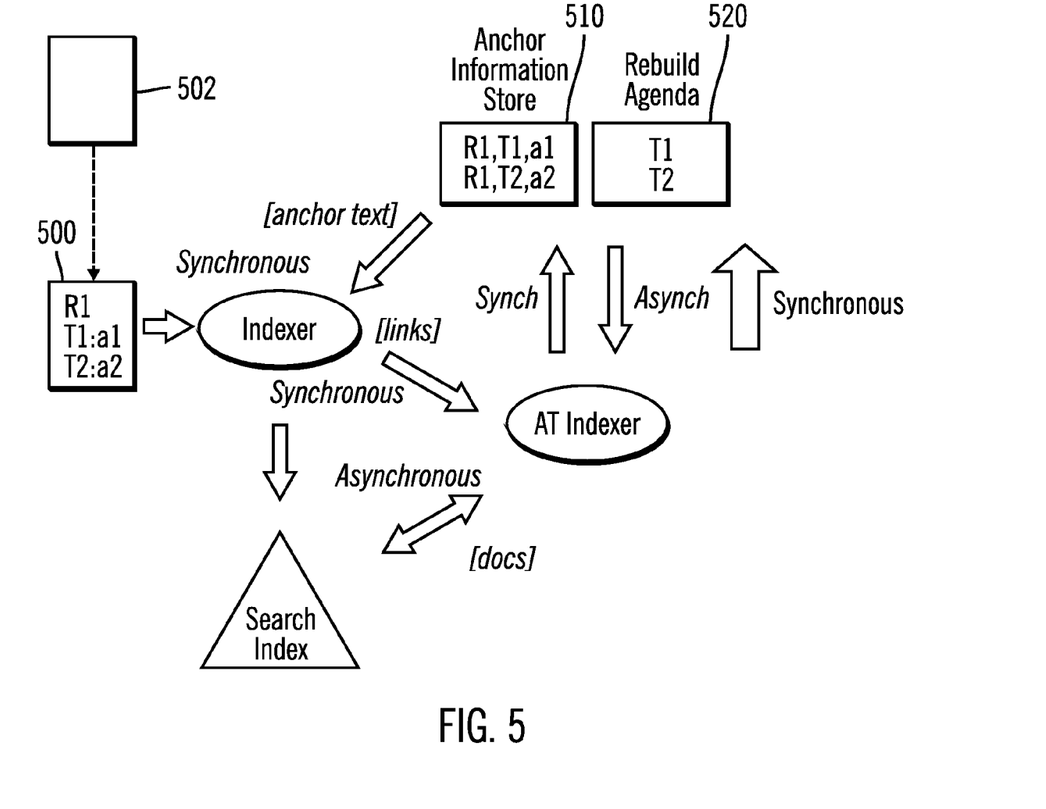
FIG. 5 illustrates flow of data in accordance with certain embodiments.

FIG. 5 illustrates flow of data in accordance with certain embodiments. A document 500 may be a target document to another referring document 502 and may be a referring document (R1) to target documents (T1, T2). Target document T1 has anchor text a1, while target document T2 has anchor text a2. When the document 500 is processed, the anchor information store 510 is updated to include entries from the referring document RI to each target document T1 and T2. Since the anchor information store 500 includes anchor text for target documents T1 and T2, the rebuild agenda 520 is updated to include identifiers for target documents T1 and T2 (e.g., URLs). When the asynchronous anchor text cycle begins, the anchor text for target documents T1 and T2 will be updated.

Embodiments enable support of other forms of link analysis. That is, the anchor information store 152 and rebuild agenda 154, in any embodiment, as integrated into a search system, may support other types of link analysis in document (e.g., HTML document) collections. For example, embodiments support searches for pages containing "broken" links (e.g., references to missing or unavailable documents). In particular, for embodiments in which documents are crawled, the search index 156 may be scanned to find documents for which download status is "error", while for embodiments in which documents are pushed, "pushed delete document commands" may be processed. In any embodiments in which there are references to missing or unavailable documents, then the anchor information store 152 is searched to find and report (e.g., to a search engine administrator or to a content owner, such as a website owner) referring documents that point to the missing or unavailable document (i.e., it is the referring document that has the broken link). As an example, the website owner then is able to update the referring document. In particular, when a document is missing or unavailable (e.g., its download status is error or there is a "pushed delete document command" for the document), one or more entries in the anchor information store for which the document is the target document are located and the referring document in each of the identified entries is reported to a search engine administrator and/or a content owner of the referring document. Also, when a document is missing or unavailable (e.g., its download status is error or there is a "pushed delete document command" for the document), the entries in the anchor information store 152 for which that document is the referring document are located and deleted and the target documents of those entries are registered in the rebuild agenda 154.

As another example, embodiments support studies of site connectedness (i.e., which sites are most significant/best connected) by generating a graph that shows connections of nodes using the anchor information store 152. Also, embodiments support adjusting search-result weight according to the significance/popularity of a page or site based on in-link count by counting the number of referring documents (i.e., in-links) for a document in the anchor information store 152. Embodiments also support a form of "tagging" and "social bookmarking", with different tags. Tags in this context are a different form of anchor text. Instead of being embedded in the content of a document, the tags are "attached" to a document externally (e.g., users can annotate documents with keywords, which are tags), in an environment that supports making such attachments. Thus, a tag is similar to anchor text because the tag represents a user's summary of the subject of the document. Therefore, the anchor information store 152 may store tags instead of or in addition to anchor text. With such tags, embodiments enable finding documents using the keywords in those attachments (a "social network" environment).

In addition, embodiments are applicable to any kind of feedback that can be attached to a document, including votes that indicate that users like that page or clickthrough data (e.g., the fact that a user clicks on a search result may be considered a "vote" for that page). Any of this information may be included in the anchor information store 152.

Some of these analyses improve the functioning of the search system itself, while others benefit content administrators and users.

Figure 6:
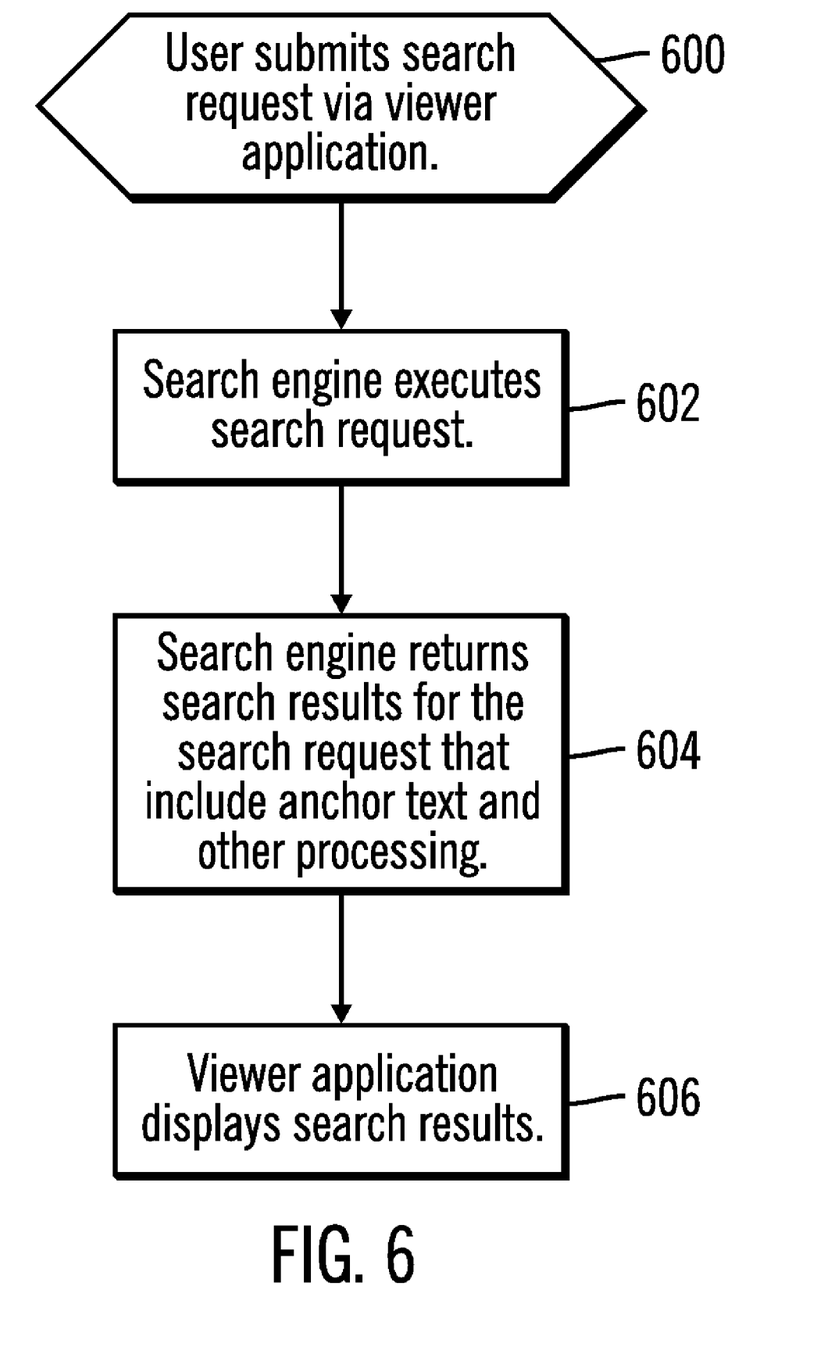
FIG. 6 illustrates logic for performing a document search in accordance with certain embodiments of the invention

FIG. 6 illustrates logic for performing a document search in accordance with certain embodiments of the invention. Control begins at block 600 with a user submitting a search request via the viewer application 112. In block 602, the search engine 130 executes the search request. In block 604, the search engine returns search results for the search request that include the anchor text processing. In block 606, the viewer application 112 displays the search results.

Thus, embodiments add anchor text into the search index 156 early in the processing of documents in a corpus, rather than making the user wait for an offline integration process for the anchor text to be added to the search index. Thus, with certain embodiments, anchor-text processing occurs continuously, in parallel with searching. This provides incremental anchor text processing. In certain embodiments, a document's content and anchor text may sometimes be indexed more than once, as newer anchor text becomes available. However, with certain embodiments, there is a gain in search quality and early availability of anchor text in the search index 156.

JAVA is a registered trademark or common law mark of Sun Microsystems in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic array (PLA), etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 2, 3, 4, and 6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, 4, and 6 may be implemented in software, hardware, programmable and non-programmable gate array logic or in some combination of hardware, software, or gate array logic.

Figure 7:
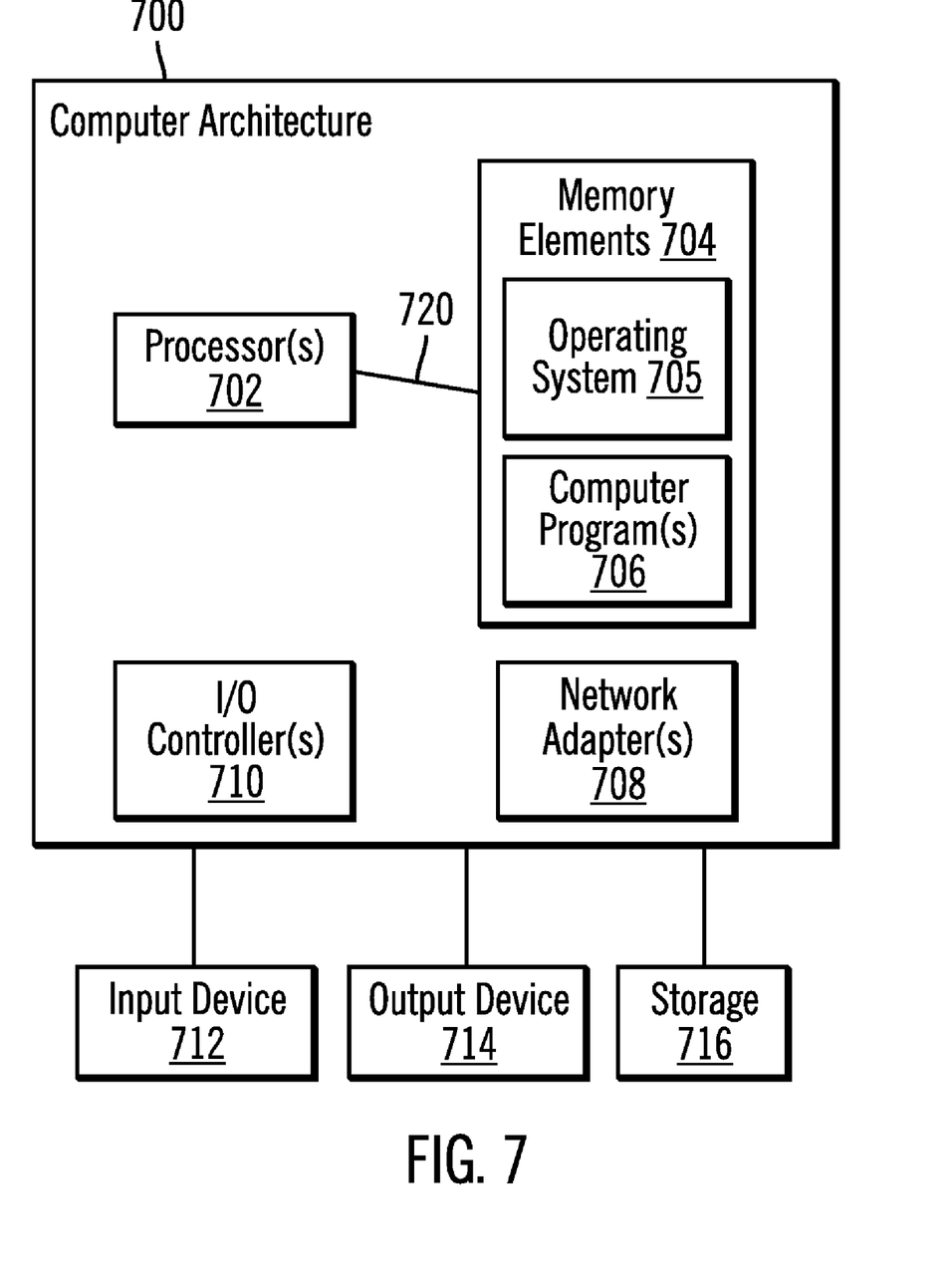
FIG. 7 illustrates a system architecture that may be used in accordance with certain embodiments.

FIG. 7 illustrates a system architecture 700 that may be used in accordance with certain embodiments. Client computer 100 and/or server computer 120 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for building a search index:
  while building the search index and using the search index to respond to one or more search requests and performing synchronous anchor text processing,
    maintaining an anchor information store, wherein each entry of the anchor information store identifies a referring document, a target document, and anchor text associated with a link from the referring document to the target document;
    maintaining a rebuild agenda, wherein each entry of the rebuild agenda identifies a target document that has an entry in the search index and whose anchor text is to be updated in the search index with asynchronous processing because there is at least one new or updated link pointing to the target document;
    receiving a document for processing;
    for each outgoing link in the document that points to a target document,
      adding an entry to the anchor information store that identifies the received document, the target document, and anchor text; and
      adding an entry to the rebuild agenda for the target document; and
    for each link pointing from a referring document to the document,
      locating one or more entries in the anchor information store for which the received document to be processed is identified as the target document;
      retrieving anchor text from each of the identified entries; and
      storing the retrieved anchor text in an entry of the search index for the received document; and
    performing asynchronous anchor text processing to incrementally update current entries in the search index for each document identified in each entry in the rebuild agenda in parallel with the building of the search index and in parallel with using the search index to respond to one or more search requests by:
      selecting a first target document in the rebuild agenda;
      using the anchor information store to find anchor text for the first target document by identifying one or more entries in the anchor information store for which the first target document is identified as the target document in the anchor information store;
      retrieving anchor text from each of the identified entries; and
      incrementally updating the anchor text in the entry of the search index for the first target document.

2. The computer-implemented method of claim 1, wherein the received document in the entry added to the anchor information store for the outgoing link is a referring document.

3. The computer-implemented method of claim 1, further comprising:
  when a document is one of missing and unavailable,
    locating one or more entries in the anchor information store for which the document is a referring document;
    for each of the one or more entries, registering the target document of that entry in the rebuild agenda; and
    deleting the one or more entries from the anchor information store.

4. The computer-implemented method of claim 1, further comprising:
  when a document is one of missing and unavailable,
    locating one or more entries in the anchor information store for which the document is the target document; and
    reporting the referring document in each of the identified entries to one of a search engine administrator and a content owner of the referring document.

5. The computer-implemented method of claim 1, further comprising:
  generating a graph that shows connections of nodes using the anchor information store to enable studying site connectedness.

6. The computer-implemented method of claim 1, further comprising:
  adjusting a search-result weight associated with the document based on an in-link count determined by counting a number of referring documents for the document in the anchor information store.

7. The computer-implemented method of claim 1, wherein the anchor information store includes tags, which are user annotations of documents.

8. The computer-implemented method of claim 1, further comprising:
  when the document has been updated with new content,
    comparing existing entries in the anchor information store for which the document is a referring document with a current set of anchors in the document;
    deleting each entry from the anchor information store that no longer matches the document content;
    adding a new entry to the anchor information store for each new anchor in the document; and
    registering a target document of any entry that was one of deleted from and added to the anchor information store in the rebuild agenda.

9. A computer program product comprising a computer readable storage medium storing a computer readable program, wherein the computer readable program when executed by a processor on a computer causes the computer to:
- while building the search index and using the search index to respond to one or more search requests and performing synchronous anchor text processing,
  - maintain an anchor information store, wherein each entry of the anchor information store identifies a referring document, a target document, and anchor text associated with a link from the referring document to the target document;
  - maintain a rebuild agenda, wherein each entry of the rebuild agenda identifies a target document that has an entry in the search index and whose anchor text is to be updated in the search index with asynchronous processing because there is at least one new or updated link pointing to the target document;
  - receive a document for processing;
  - for each outgoing link in the document that points to a target document,
    - add an entry to the anchor information store that identifies the received document, the target document, and anchor text; and
    - add an entry to the rebuild agenda for the target document; and
  - for each link pointing from a referring document to the document, locate one or more entries in the anchor information store for which the received document to be processed is identified as the target document;
  - retrieve anchor text from each of the identified entries; and
  - store the retrieved anchor text in an entry of the search index for the received document; and
- perform asynchronous anchor text processing to incrementally update current entries in the search index for each document identified in each entry in the rebuild agenda in parallel with the building of the search index and in parallel with using the search index to respond to one or more search requests by:
  - selecting a first target document in the rebuild agenda;
  - using the anchor information store to find anchor text for the first target document by identifying one or more entries in the anchor information store for which the first target document is identified as the target document in the anchor information store;
  - retrieving anchor text from each of the identified entries; and
  - updating the anchor text in the entry of the search index for the first target document.

10. The computer program product of claim 9, wherein the received document in the entry added to the anchor information store for the outgoing link is a referring document.

11. The computer program product of claim 9, wherein the computer readable program when executed on a computer causes the computer to:
- when a document is one of missing and unavailable,
  - locate one or more entries in the anchor information store for which the document is a referring document;
  - for each of the one or more entries, register the target document of that entry in the rebuild agenda; and
  - delete the one or more entries from the anchor information store.

12. The computer program product of claim 9, wherein the computer readable program when executed on a computer causes the computer to:
- when a document is one of missing and unavailable,
  - locate one or more entries in the anchor information store for which the document is the target document; and
  - report the referring document in each of the identified entries to one of a search engine administrator and a content owner of the referring document.

13. The computer program product of claim 9, wherein the computer readable program when executed on a computer causes the computer to:
- generate a graph that shows connections of nodes using the anchor information store to enable studying site connectedness.

14. The computer program product of claim 9, wherein the computer readable program when executed on a computer causes the computer to:
- adjust a search-result weight associated with the document based on an in-link count determined by counting a number of referring documents for the document in the anchor information store.

15. The computer program product of claim 9, wherein the anchor information store includes tags, which are user annotations of documents.

16. The computer program product of claim 9, wherein the computer readable program when executed on a computer causes the computer to:
- when the document has been updated with new content,
  - compare existing entries in the anchor information store for which the document is a referring document with a current set of anchors in the document;
  - delete each entry from the anchor information store that no longer matches the document content;
  - add a new entry to the anchor information store for each new anchor in the document; and
  - register a target document of any entry that was one of deleted from and added to the anchor information store in the rebuild agenda.

17. A system for building a search index, comprising:
hardware logic capable of performing operations, the operations comprising:
- while building the search index and using the search index to respond to one or more search requests and performing synchronous anchor text processing:
  - maintaining an anchor information store, wherein each entry of the anchor information store identifies a referring document, a target document, and anchor text associated with a link from the referring document to the target document;
  - maintaining a rebuild agenda, wherein each entry of the rebuild agenda identifies a target document that has an entry in the search index and whose anchor text is to be updated in the search index with asynchronous processing because there is at least one new or updated link pointing to the target document;
  - receiving a document for processing;
  - for each outgoing link in the document that points to a target document,
    - adding an entry to the anchor information store that identifies the received document, the target document, and anchor text; and
    - adding an entry to the rebuild agenda for the target document; and
  - for each link pointing from a referring document to the document, locating one or more entries in the anchor information store for which the received document to be processed is identified as the target document;

retrieving anchor text from each of the identified entries; and storing the retrieved anchor text in an entry of the search index for the received document; and performing asynchronous anchor text processing to incrementally update current entries in the search index for each document identified in each entry in the rebuild agenda in parallel with the building of the search index and in parallel with using the search index to respond to one or more search requests by:

selecting a first target document in the rebuild agenda;

using the anchor information store to find anchor text for the first target document by identifying one or more entries in the anchor information store for which the first target document is identified as the target document in the anchor information store;

retrieving anchor text from each of the identified entries; and updating the anchor text in the entry of the search index for the first target document.

18. The system of claim 17, wherein the received document in the entry added to the anchor information store for the outgoing link is a referring document.

19. The system of claim 17, wherein the operations further comprise:

when a document is one of missing and unavailable, locating one or more entries in the anchor information store for which the document is a referring document;

for each of the one or more entries, registering the target document of that entry in the rebuild agenda; and deleting the one or more entries from the anchor information store.

20. The system of claim 17, wherein the operations further comprise:

when a document is missing or unavailable, locating one or more entries in the anchor information store for which the document is the target document; and reporting the referring document in each of the identified entries to one of a search engine administrator and a content owner of the referring document.

21. The system of claim 17, wherein the operations further comprise:

generating a graph that shows connections of nodes using the anchor information store to enable studying site connectedness.

22. The system of claim 17, wherein the operations further comprise:

adjusting a search-result weight associated with the document based on an in-link count determined by counting a number of referring documents for the document in the anchor information store.

23. The system of claim 17, wherein the anchor information store includes tags, which are user annotations of documents.

24. The system of claim 17, wherein the operations further comprise:

when the document has been updated with new content, comparing existing entries in the anchor information store for which the document is a referring document with a current set of anchors in the document;

deleting each entry from the anchor information store that no longer matches the document content;

adding a new entry to the anchor information store for each new anchor in the document; and registering a target document of any entry that was one of deleted from and added to the anchor information store in a rebuild agenda.

* * * * *